United States Patent
Lee et al.

(10) Patent No.: US 10,698,809 B2
(45) Date of Patent: Jun. 30, 2020

(54) METHOD, ASSOCIATED FLASH CONTROLLER AND ELECTRONIC DEVICE FOR ACCESSING FLASH MODULE WITH DATA VALIDITY VERIFICATION

(71) Applicant: Silicon Motion Inc., Hsinchu County (TW)

(72) Inventors: Jie-Hao Lee, Kaohsiung (TW); Hsuan-Ping Lin, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 135 days.

(21) Appl. No.: 16/011,616

(22) Filed: Jun. 18, 2018

(65) Prior Publication Data

US 2019/0171559 A1   Jun. 6, 2019

(30) Foreign Application Priority Data

Dec. 5, 2017   (TW) .............................. 106142465 A (51) Int. Cl.
*G06F 12/02*   (2006.01)
*G06F 12/1009*   (2016.01)

(52) U.S. Cl.
CPC ...... *G06F 12/0246* (2013.01); *G06F 12/0253* (2013.01); *G06F 12/0292* (2013.01); *G06F 12/1009* (2013.01); *G06F 2212/7201* (2013.01); *G06F 2212/7205* (2013.01)

(58) Field of Classification Search
CPC ............. G06F 12/0246; G06F 12/0292; G06F 12/1009; G06F 12/0253; G06F 2212/7201; G06F 2212/7205; G06F 2212/7207; G06F 2212/1044
See application file for complete search history.

(56) References Cited

U.S. PATENT DOCUMENTS

| | | | |
|---|---|---|---|
| 9,003,159 B2 | 4/2015 | Deshkar | |
| 2011/0107015 A1* | 5/2011 | Chu | G06F 12/0246 711/103 |
| 2015/0324284 A1* | 11/2015 | Kim | G06F 12/0246 711/103 |
| 2019/0227925 A1* | 7/2019 | Hsu | G06F 12/0253 |

FOREIGN PATENT DOCUMENTS

TW   201729099 A   8/2017

* cited by examiner

*Primary Examiner* — Larry T Mackall
(74) *Attorney, Agent, or Firm* — Winston Hsu (57) ABSTRACT

The present invention provides a method for accessing a flash module, wherein the method includes: creating a logical address group table corresponding to a block of the flash module, wherein the logical address group table records states of a plurality of logical address groups, and the state of each logical address group represents if data written into the block has any logical address within the logical address group; when the block is under a garbage collection operation, referring to the logical address group table to read at least one logical address to physical address (L2P) mapping table; and determining valid pages and invalid pages within the block according to the L2P table, for performing the garbage collection operation.

18 Claims, 7 Drawing Sheets

FIG. 7

METHOD, ASSOCIATED FLASH CONTROLLER AND ELECTRONIC DEVICE FOR ACCESSING FLASH MODULE WITH DATA VALIDITY VERIFICATION

BACKGROUND OF THE INVENTION

1. Field of the Invention

The present invention relates to a flash, and more particularly, to a method for accessing a flash module, a related flash controller and an electronic device.

2. Description of the Prior Art

When storage space of a flash module is insufficient, a flash controller therein will perform a garbage collection operation to move data of valid pages of a block within a plurality of blocks to another block and then erase the contents in the previous block, in order to release storage space. Since the above operation requires correctly determining valid pages and invalid pages for each block, prestoring of related address information for comparison will be needed. As block sizes and number of pages increase, the data amount of the address information will also increase. This reduces the storage space in the flash module, and also lowers the processing efficiency of the flash controller.

SUMMARY OF THE INVENTION

In view of the above, one objective of the present invention is to provide a method for accessing a flash module, wherein the method only requires a small data amount to store address information in each block and can efficiently determine the valid pages and invalid pages in each block, to solve the problems existing in the related arts.

According to an embodiment of the present invention, a method for accessing a flash module is provided. The method comprises: creating a logical address group table corresponding to a block of the flash module, wherein the logical address group table records states of a plurality of logical address groups, and the state of each logical address group represents whether data written into the block has any logical address located in the logical address group; when the block is under a garbage collection operation, referring to the logical address group table to read at least one logical address to physical address (L2P) mapping table from the flash module; and determining valid pages and invalid pages within the block according to the at least one L2P mapping table, for performing the garbage collection operation.

According to another embodiment of the present invention, a flash controller is provided. The flash controller comprises a read only memory (ROM), a microprocessor and a memory. The ROM is arranged to store a code; The microprocessor is arranged to execute the code to control access of the flash module; and the memory is arranged to store a logical address group table corresponding to a block in the flash module, wherein the logical address group table marks states of a plurality of logical address groups, wherein the state of each of the logical address groups indicates whether data written into the block has any logical address located in the logical address group. When the block requires a garbage collection operation, the microprocessor refers to the logical address group table to read at least one logical address to physical address (L2P) mapping table from the flash module, and refers to the at least one L2P mapping table to determine valid pages and invalid pages in the block, for performing the garbage collection operation.

According to yet another embodiment of the present invention, an electronic device is provided. The electronic device comprises a flash module and a flash controller. The flash controller is arranged to access the flash module, wherein the flash controller creates a logical address group table corresponding to a block in the flash module. The logical address group table marks states of a plurality of logical address groups, wherein the state of each of the logical address groups indicates whether data written into the block has any logical address located in the logical address group. When the block requires a garbage collection operation, the flash controller refers to the logical address group table to read at least one L2P mapping table from the flash module, and refers to the at least one L2P mapping table to determine valid pages and invalid pages in the block, for performing the garbage collection operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
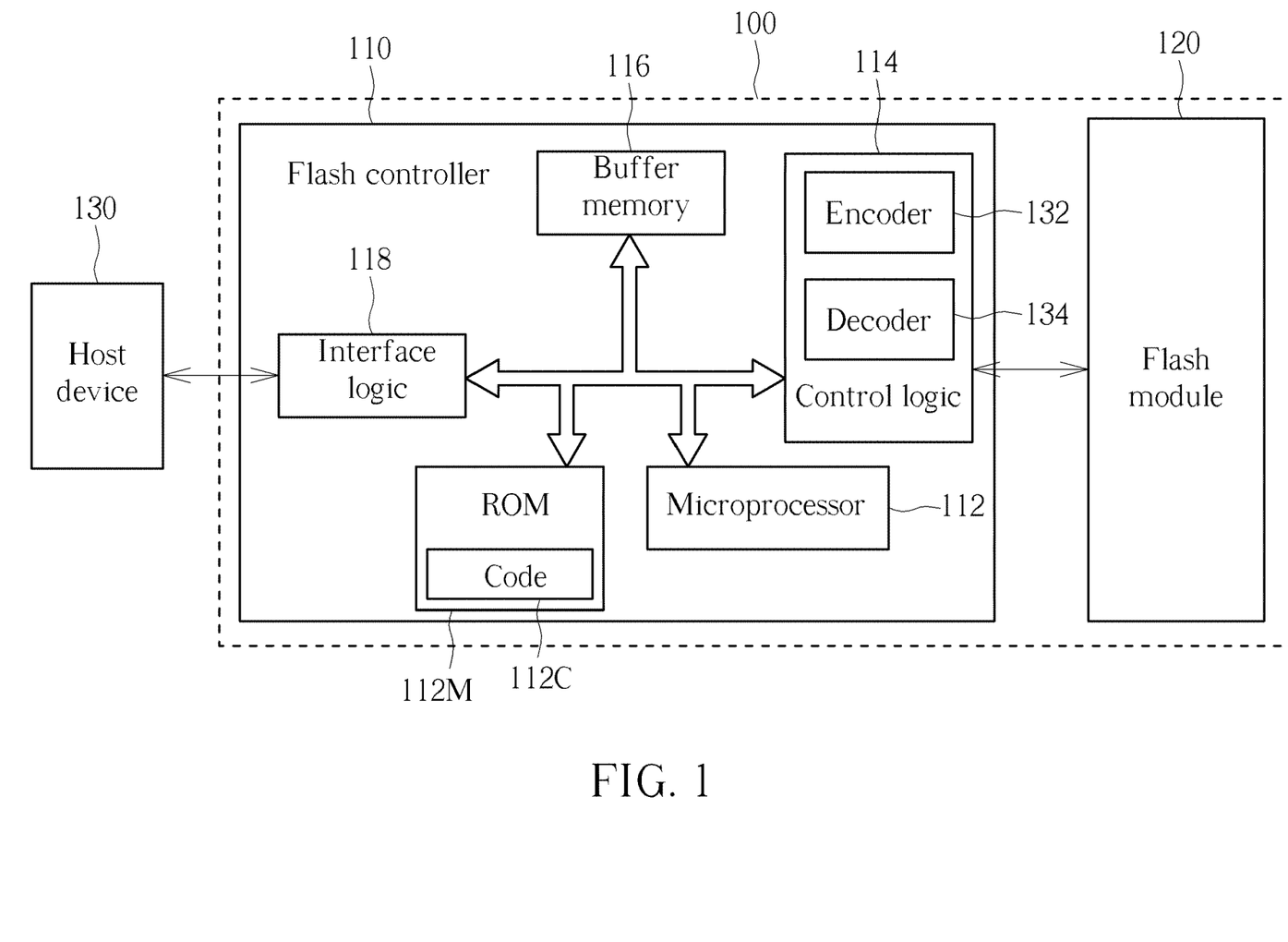
FIG. 1 is a diagram illustrating a memory device according to an embodiment of the present invention.

Refer to FIG. 1, which is a diagram illustrating a memory device 100 according to an embodiment of the present invention. The memory device 100 comprises a flash module 120 and a flash controller 110, wherein the flash controller 110 is arranged to access the flash module 120. According to this embodiment, the flash controller 110 comprises a microprocessor 112, a read only memory (ROM) 112M, a control logic 114, a buffer memory 116 and an interface logic 118. The ROM 112M is arranged to store a code 112C, and the microprocessor 112 is arranged to execute the code 112C in order to control the access of the flash module 120. The control logic 114 comprises an encoder 132 and a decoder 134, wherein the encoder 132 is arranged to encode the data written into the flash module 120 to generate a corresponding check code (which can also be called an error correction code or ECC), and the decoder 134 is arranged to decode the data read from the flash module 120.

Typically, the flash module 120 comprises a plurality of flash chips each comprising a plurality of blocks, and the controller (e.g. the flash controller 110 that executes the code 112C via the microprocessor 112) performs data erasing operations upon the flash module 120 using a "block" as the unit. Further, a block may record a specific number of pages, wherein the controller (e.g. the flash controller 110 that executes the code 112C via the microprocessor 112) performs data writing operations upon the flash module 120 using a "page" as the unit. In this embodiment, the flash module 120 may be a 3D NAND-type flash.

In practice, the flash controller 110 that executes the code 112C via the microprocessor 112 may utilize its inner elements to perform various control operations, such as utilizing the control logic 114 to control access operations of the flash module 120 (especially the access operations of at least one block or at least one page), utilizing the buffer memory 116 to perform necessary buffering processes, and utilizing the interface logic 118 to communicate with a host device 130. The buffer memory 116 is implemented with a random access memory (RAM). The buffer memory 116 may be a static RAM (SRAM), but the present invention is not limited thereto.

In one embodiment, the memory device 100 may be a portable memory device (e.g. a memory card conforming to SD/MMC, CF, MS, XD specifications), and the host device 130 may be an electronic device connectable to memory devices, such as a cellphone, laptop computer, desktop computer, etc. In another example, the memory device 100 may be a solid state drive (SSD) or an embedded storage device that conforms to the Universal Flash Storage (UFS) or Embedded Multi Media Card (EMMC) specifications, in order to be configured in an electronic device (e.g. cellphone, laptop computer, desktop computer, etc.), wherein the host device 130 may be a processor of the electronic device.

Figure 2:
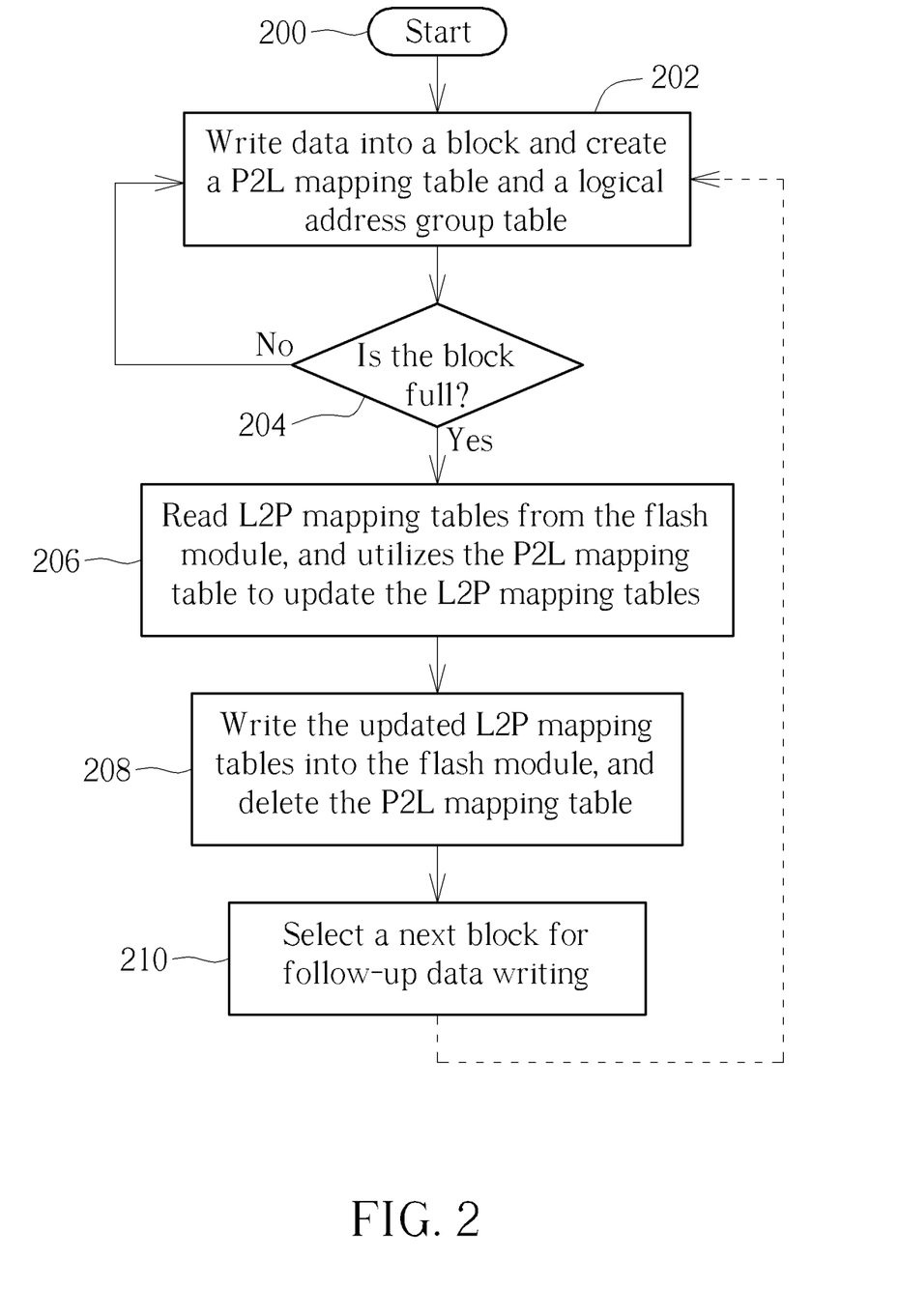
FIG. 2 is a flowchart illustrating accessing a flash module according to an embodiment of the present invention.

Refer to FIG. 2, which is a flowchart illustrating accessing the flash module 120 according to an embodiment of the present invention. The flow begins at Step 200. In Step 202, the flash controller 110 receives at least one writing command from the host device 130 to write a first set of data into a block of the flash module 120. In this embodiment, referring to FIG. 3, the flash module 120 comprises the flash chips 310 and 320, each comprising a plurality of blocks B_0-B_M, wherein each block comprises N pages P0-PN. In the following descriptions, the flash controller 110 sequentially writes data into the block B_0 of the flash chip 310. Note that said "block" can be extended to a block that comprise chips located at different planes, so-called "super block". For example, assuming each of the flash chips 310, 320 comprises two planes, and the block B_0, B_M are located at different planes, the block B_0, B_M of the flash chip 310 and the block B_0, B_M of the flash chip 320 can form a super block.

Figure 3:
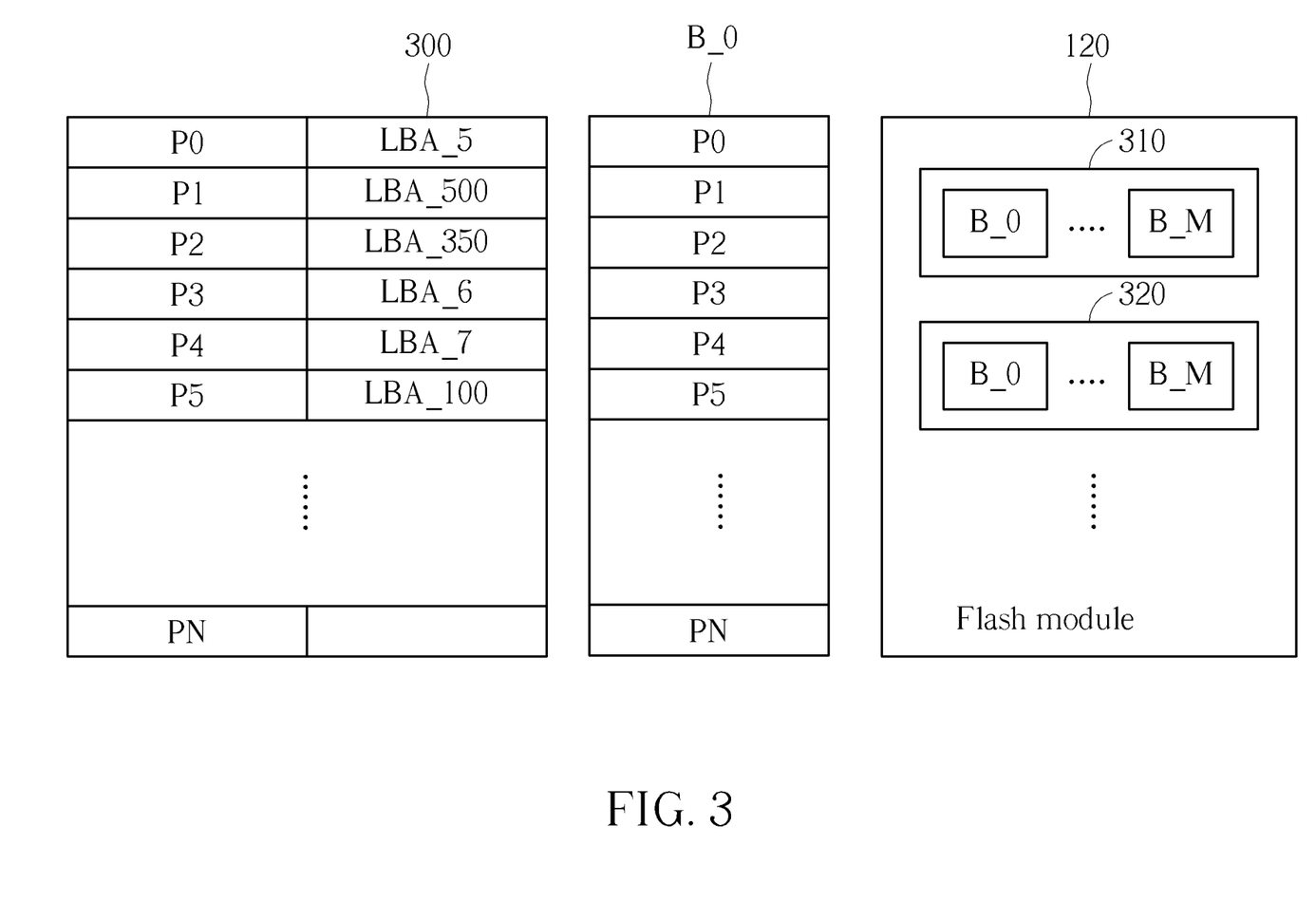
FIG. 3 is a diagram illustrating a physical address to logical address (P2L) mapping table.

Before writing data into the block B_0, the microprocessor 112 will create a physical address to logical address mapping table (hereinafter P2L mapping table) 300, and store it in the buffer memory 116, wherein the P2L mapping table 300 comprises physical addresses P0-PN of successive pages in the block B_0 and corresponding logical addresses. Specifically, in the beginning, the flash controller 110 writes data from the host device 130 having the logical address LBA_5 into the page P0, and then writes data from the host device 130 having the logical addresses LBA_500, LBA_350, LBA_6, LBA_7 and LBA_100 into the pages P1-P5, respectively.

Figure 4:
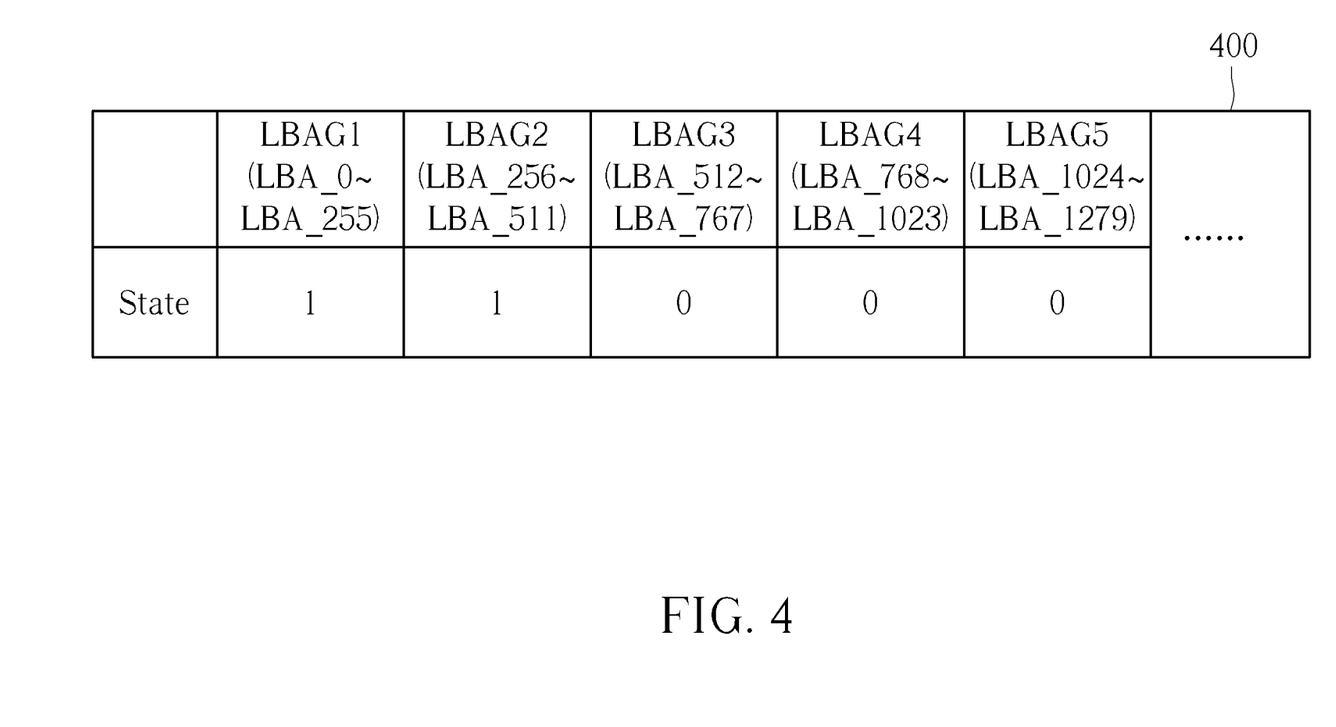
FIG. 4 is a diagram illustrating a logical address group table.

The microprocessor 112 further records a logical address group table 400 shown in FIG. 4, and stores it in the buffer memory 116, wherein the logical address group table 400 marks the states of a plurality of logical address groups, wherein the state of each logical address group is arranged to indicate whether the P2L mapping table 300 records any logical address located in the logical address group. In this embodiment, the logical address group table 400 at least comprises the logical address groups LBAG1-LBAG5 each having a logical address range. For example, the logical address group LBAG1 may comprise the logical addresses LBA_0-LBA_255, the logical address group LBAG2 may comprise the logical addresses LBA_256-LBA_511, the logical address group LBAG3 comprise the logical addresses LBA_512-LBA_767, the logical address group LBAG4 may comprise the logical addresses LBA_768-LBA_1023, and the logical address group LBAG5 may comprise the logical addresses LBA_1024-LBA_1279. Further, the logical address group table 400 may indicate the state of each logical address group with one bit. For example, the P2L mapping table records LBA_5-LBA_7, LBA_100, LBA_350 and LBA_500, and thus the digital values of the states of the logical address groups LBAG1 and LBAG2 will be set as "1"; since the P2L mapping table does not comprise the logical addresses LBA_512-LBA_1279, the digital values of the states of the logical address group LBAG3-LBAG5 will be set as "0".

It should be noted that the logical address group table 400 shown in FIG. 4 is merely for illustrative purposes, and is not a limitation of the present invention. As long as the logical address group table 400 is still capable of showing whether the P2L mapping table 300 records any logical address located in logical address groups, some detailed parts can be modified. All modifications based on design requirements should fall within the scope of the present invention.

In Step 204, the microprocessor 112 determines whether the last page PN in the block B_0 has completed data writing (i.e. examining if the block B_0 is full); if not, Step 202 will be entered to continue writing data into the block B_0; if the data writing is completed, Step 206 will be entered. In Step 206, the microprocessor 112 refers to the contents of the logical address group table 400 to read a portion of the L2P mapping table from the flash module 120, and utilizes the P2L mapping table 300 to update the read contents of the L2P mapping table. Taking the embodiments shown in FIGS. 3 and 4 as examples, the logical address group table 400 only records the states of the logical address groups LBAG1, LBAG2 as "1", which means only two L2P mapping tables respectively comprising the logical addresses LBA_0-LBA_255 and LBA_256-LBA_511 need to be updated (in this embodiment, each logical address group corresponds to an L2P mapping table, and has an identical logical address range). Hence, the microprocessor 112 will read the two L2P mapping tables 510, 520 shown in FIG. 5 from the flash module 120. Note that, in this embodiment, the index of a logical address represents the order of the logical address, and successive indexes represent continuous logical addresses. Further, since there are only four sets of information corresponding to the logical address ranges LBA_0-LBA_255 in the P2L mapping table 300, the microprocessor 112 updates the logical address LBA_5 in the L2P mapping table 510 to be the page P0 corresponding to the block B_0, updates the logical address LBA_6 to be the page P3 corresponding to the block B_0, updates the logical address LBA_7 to be the page P4 corresponding to the block B_0, and updates the logical address LBA_100 to be the page P5 corresponding to the block B_0. In addition, since there are two sets of information in the P2L mapping table 300 that correspond to the logical address ranges LBA_256-LBA_511, the microprocessor 112 will update the logical address LBA_350 in the L2P mapping table 520 to be the page P2 corresponding to the block B_0, and update the logical address LBA_500 to be the page P1 corresponding to the block B_0.

Figure 5:
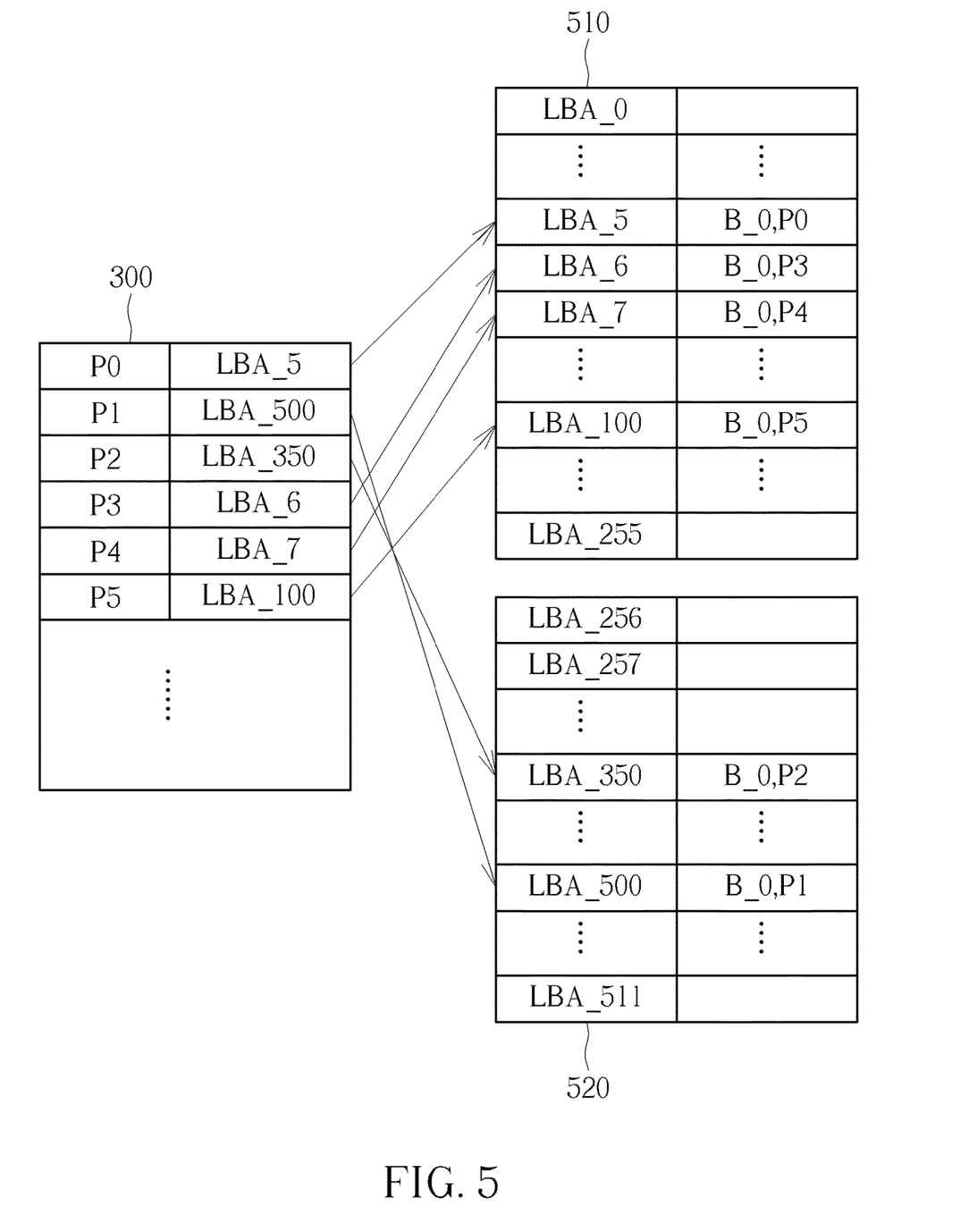
FIG. 5 is a diagram illustrating using a P2L mapping table to update a logical address to physical address (L2P) mapping table according to an embodiment of the present invention.

In Step 208, the microprocessor 112 stores the updated L2P mapping tables 510, 520 into the flash module 120, and deletes the P2L mapping table 300 corresponding to the block B_0 from the buffer memory 116. In an embodiment, the P2L mapping table 300 will not be stored into the flash module 120; while in another embodiment, the microprocessor 112 will store the logical address group table 400 into the flash module 120.

Figure 6:
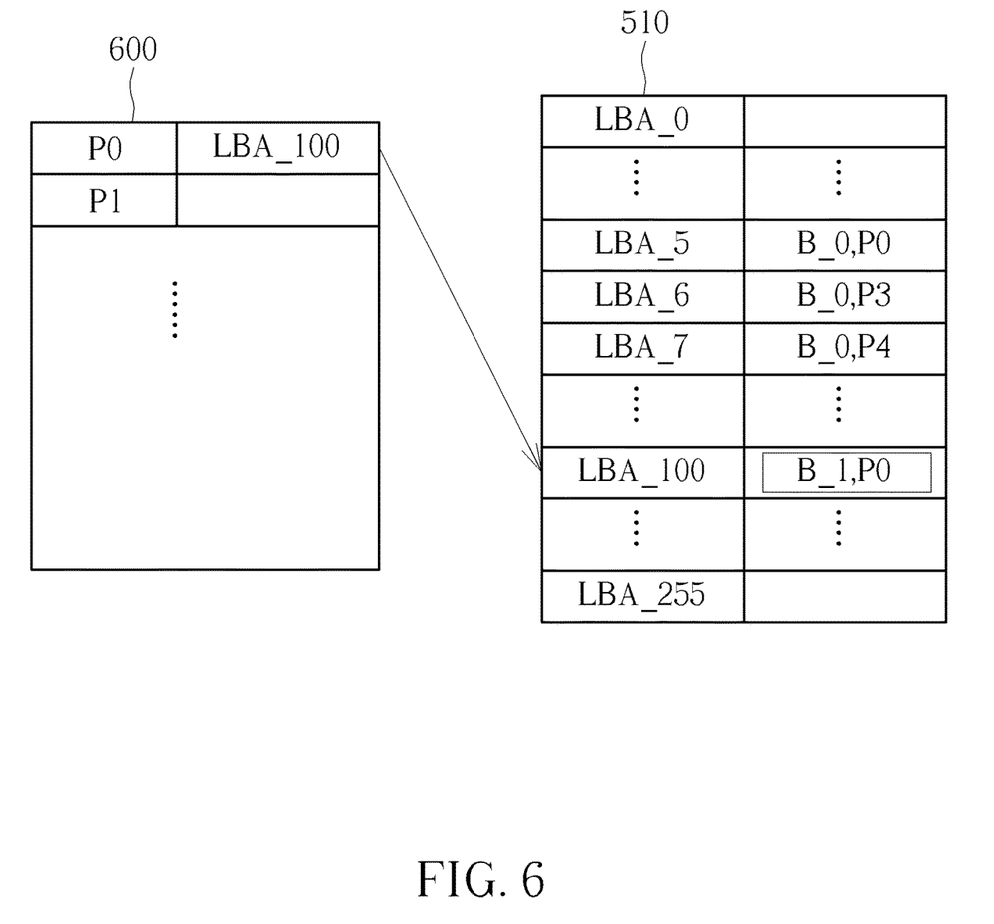
FIG. 6 is a diagram illustrating using a P2L to update an L2P mapping table once again according to an embodiment of the present invention.

In Step 210, the flash controller 110 selects a next block (e.g. the block B_1) for follow-up data writing, and then the flow goes back to Step 202. Referring to an embodiment shown in FIG. 6, the flow is assumed to go back to Step 202, and the flash controller 110 receives a writing command from the host device 130 that demands the update of data having the logical address LBA_100. The microprocessor 112 will create the P2L mapping table 600 based on the block B_1, and further read the L2P mapping table 510 from the flash module 120 and update it, in order to update the logical address LBA_100 to be the page P0 corresponding to the block B_1. After that, the page P0 is stored into the flash module 120.

In the above embodiment, after all pages of the block B_0 are fully written, the P2L mapping table 300 occupied by a larger data amount may be directly deleted to save storage space, while the logical address group table 400 corresponding to the block B_0 will be stored for follow-up garbage collecting operations. Further, since the data amount of the logical address group table 400 is small, the storage space of the flash module 120 can be saved by a significant amount.

Figure 7:
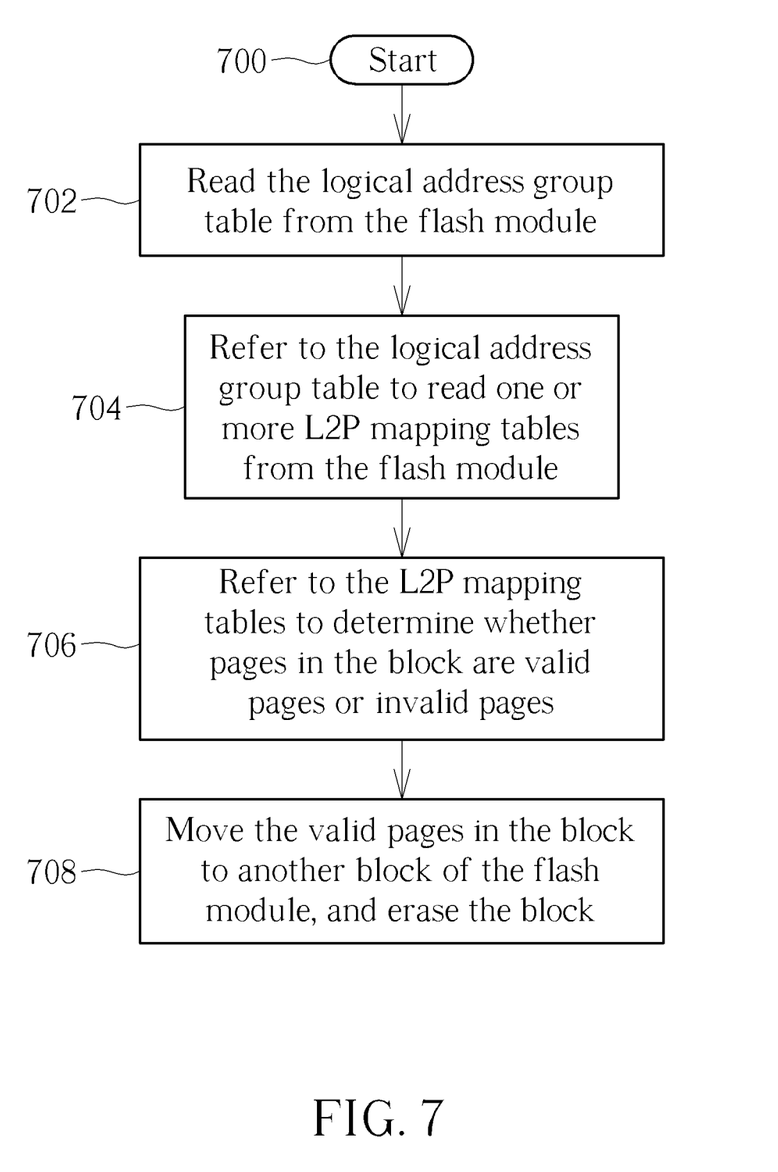
FIG. 7 is a flowchart illustrating performing a garbage collection operation according to an embodiment of the present invention.

FIG. 7 is a flowchart illustrating performing a garbage collection operation according to an embodiment of the present invention, wherein the garbage collecting operation in this embodiment utilizes the block B_0 shown in FIG. 3, and some related content is illustrated using the embodiments shown in FIGS. 3-6 for better comprehension. In Step 700, the flow begins and the flash controller 110 is ready to perform a garbage collecting operation upon the block B_0. In Step 702, the flash controller 110 reads the logical address group table 400 corresponding to the block B_0 from the flash module 120, and temporarily store it into the buffer memory 116. In Step 704, the microprocessor 112 refers to the contents of the logical address group table 400 to read one or more L2P mapping tables from the flash module 120. In this embodiment, since the logical address group table 400 only records the states of the logical address groups LBAG1, LBAG2 as "1", the microprocessor 112 will only need to read the two L2P mapping tables 510, 520 from the flash module 120, without the need for reading any other L2P mapping tables.

Next, in Step 706, the microprocessor 112 reads the contents of the block B_0, and refers to the two L2P mapping tables 510, 520 to determine whether the pages therein are valid pages or invalid pages. More specifically, based on a specific logical address commonly comprised by the block B0 and the L2P mapping tables 510, 520, the microprocessor 112 determines whether a corresponding physical address of the specific logical address in the L2P mapping tables 510, 520 is identical to that of the specific logical address in the block B_0. If the determination result shows that the two physical addresses are identical, this indicates that pages in the block B_0 that have the physical address are valid pages; and if the determination result shows that the two physical addresses are different, pages of the block B_0 that have the physical address will be determined to be invalid pages. Taking embodiments of FIGS. 3-6 as an example, since the pages P0-P4 in the block B_0 respectively corresponding to the logical addresses LBA_5, LBA_500, LBA_350, LBA_6 and LBA_7 are identical to those recorded in the L2P mapping tables 510, 520, the microprocessor 112 may directly determine the pages P0-P4 in the block B_0 to be valid pages. Since the physical address in the block B_0 that corresponds to the logical address LBA_100 is (B_0, P5), while (B_1, P0) is recorded in the L2P mapping table 510 shown in FIG. 6, the microprocessor 112 will determine the page P5 in the block B_0 to be an invalid page.

In Step 708, the microprocessor 112 only moves valid pages in the block B_0 (e.g. the pages P0-P4) to another block of the flash module 120, and erases the block B_0 in order to release more storage space.

To briefly summarize the present invention, the method for accessing a flash module additionally creates a logical address group table with a small data amount for the follow-up garbage collecting operation. When the flash controller performs the garbage collecting operation, the logical address group table provides a fast and easy reference for reading a correct L2P mapping table to determine valid pages and invalid pages in a block. The goal of saving storage space and keeping the efficiency of the flash controller can thereby be achieved by implementing the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash module, comprising:
creating a logical address group table corresponding to a block of the flash module, wherein the logical address group table records states of a plurality of logical address groups, and the state of each logical address group represents whether data written into the block has any logical address located in the logical address group;
when the block is under a garbage collection operation, referring to the logical address group table to read at least one logical address to physical address (L2P) mapping table from the flash module; and
determining valid pages and invalid pages within the block according to the at least one logical address to physical address (L2P) mapping table, for performing the garbage collection operation;
wherein the step of creating the logical address group table corresponding to the block comprises:
writing the data into the block, and creating a physical address to logical address (P2L) mapping table which comprises a plurality of successive physical addresses and corresponding logic addresses in the block; and
creating the logical address group table according to the P2L mapping table.

2. The method of claim 1, wherein the logical address group table indicates the state of the logical address group with a bit, and each of two digital values of the bit indicates whether the P2L mapping table records any logical address located in the logical address group.

3. The method of claim 1, further comprising:
deleting the P2L mapping table after the logical address group table is created.

4. The method of claim 3, wherein the P2L mapping table is not stored into the flash module.

5. The method of claim 3, further comprising:
writing the logical address group table into the flash module.

6. The method of claim 1, wherein each logical address group comprises a logical address range, and the logical address range is equal to a range of an L2P mapping table stored in the flash module.

7. The method of claim 6, wherein the step of referring to the logical address group table to read at least one L2P mapping table from the flash module comprises:
referring to the logical address group table to determine at least one specific logical address group, wherein the state of the at least one specific logical address group indicates that data written into the block has a logical address located in the logical address group; and
reading the at least one L2P mapping table corresponding to the at least one specific logical address group from the flash module, without reading any other L2P mapping tables.

8. The method of claim 1, wherein the step of determining the valid pages and the invalid pages within the block according to the at least one L2P mapping table comprises:
based on a specific logical address comprised by the block and the at least one L2P mapping table, determining whether a corresponding physical address of the specific logical address in the at least one L2P mapping table is identical to that of the specific logical address in the block;
when a determination result indicates that the two physical addresses are identical, determining pages in the block that have the physical address as valid pages; and
when the determination result indicates that the two physical addresses are not identical, determining pages in the block that have the physical address to be invalid pages.

9. A flash controller, arranged to access a flash module, and the flash controller comprising:
a read only memory (ROM), arranged to store a code;
a microprocessor, arranged to execute the code to control the access of the flash module; and
a memory, arranged to store a logical address group table corresponding to a block in the flash module, wherein the logical address group table marks states of a plurality of logical address groups, and the state of each of the logical address groups indicates whether data written into the block has any logical address located in the logical address group;
wherein when the block requires a garbage collection operation, the microprocessor refers to the logical address group table to read at least one logical address to physical address (L2P) mapping table from the flash module, and refers to the at least one L2P mapping table to determine valid pages and invalid pages in the block, for performing the garbage collection operation; and the microprocessor creates a physical address to logical address (P2L) mapping table while writing the data into the block, wherein the P2L mapping table comprises a plurality of successive physical addresses and corresponding logical addresses in the block; and the microprocessor creates the logical address group table according to the P2L mapping table.

10. The flash controller of claim 9, wherein the logical address group table indicates the state of the logical address group with a bit, and each of two digital values of the bit indicates whether the P2L mapping table records any logical address located in the logical address group.

11. The flash controller of claim 9, wherein after the logical address group table is created, the microprocessor deletes the P2L mapping table.

12. The flash controller of claim 11, wherein the microprocessor does not store the P2L mapping table into the flash module.

13. The flash controller of claim 11, wherein the microprocessor further writes the logical address group table into the flash module.

14. The flash controller of claim 9, wherein each logical address group comprises a logical address range, and the logical address range is equal to a range of an L2P mapping table stored in the flash module.

15. The flash controller of claim 14, wherein the microprocessor refers to the logical address group table in order to determine at least one specific logical address group, and the state of the at least one specific logical address group indicates whether data written into the block has any logical address located in the logical address group; and the microprocessor reads the at least one L2P mapping table corresponding to the at least one specific logical address group from the flash module, without reading any other L2P mapping tables.

16. The flash controller of claim 9, wherein based on a specific logical address commonly comprised by the block and the at least one L2P mapping table, the microprocessor determines whether a corresponding physical address of the specific logical address in the at least one L2P mapping table is identical to that of the specific logical address in the block; if a determination result indicates that the two physical addresses are identical, determining pages in the block that have the physical address to be valid pages; and if the determination result indicates that the two physical addresses are not identical, determining pages in the block that have the physical address to be invalid pages.

17. An electronic device, comprising:
a flash module; and
a flash controller, arranged to access the flash module, wherein the flash controller creates a logical address group table corresponding to a block in the flash module;
wherein the logical address group table marks states of a plurality of logical address groups, and the state of each of the logical address groups indicates whether data written into the block has any logical address located in the logical address group; and when the block requires a garbage collection operation, the flash controller refers to the logical address group table to read at least one L2P mapping table from the flash module, and refers to the at least one logical address to physical address (L2P) mapping table to determine valid pages and invalid pages in the block, for performing the garbage collection operation; and wherein a physical address to logical address (P2L) mapping table is created while the data is written into the block, wherein the P2L mapping table comprises a plurality of successive physical addresses and corresponding logical addresses in the block; and the logical address group table is created according to the P2L mapping table.

18. The electronic device of claim 17, wherein the flash controller deletes the P2L mapping table after the logical address group table is created; and the P2L mapping table is not stored into the flash module.

* * * * *